United States Patent
Ehmann

(10) Patent No.: US 10,414,393 B2
(45) Date of Patent: Sep. 17, 2019

(54) SYSTEMS AND METHODS FOR STABILIZING A VEHICLE

(71) Applicant: Robert Bosch GmbH, Stuttgart (DE)

(72) Inventor: Peter Ehmann, Bloomfield Hills, MI (US)

(73) Assignee: ROBERT BOSCH GMBH, Stuttgart (DE)

( * ) Notice: Subject to any disclaimer, the term of this patent is extended or adjusted under 35 U.S.C. 154(b) by 109 days.

(21) Appl. No.: 15/699,297

(22) Filed: Sep. 8, 2017

(65) Prior Publication Data

US 2019/0077394 A1 Mar. 14, 2019

(51) Int. Cl.
| | |
|---|---|
| *B60W 30/02* | (2012.01) |
| *B60K 31/00* | (2006.01) |
| *B60K 31/18* | (2006.01) |
| *B60W 10/06* | (2006.01) |
| *B60W 10/18* | (2012.01) |
| *B60T 8/17* | (2006.01) |
| *B60T 8/173* | (2006.01) |
| *B60T 8/1755* | (2006.01) |
| *B60T 8/175* | (2006.01) |

(52) U.S. Cl.
CPC ............ *B60W 30/02* (2013.01); *B60K 31/00* (2013.01); *B60K 31/18* (2013.01); *B60T 8/173* (2013.01); *B60T 8/175* (2013.01); *B60T 8/1706* (2013.01); *B60T 8/17555* (2013.01); *B60W 10/06* (2013.01); *B60W 10/18* (2013.01); *B60W 2520/00* (2013.01); *B60W 2710/0666* (2013.01); *B60W 2710/182* (2013.01); *B60Y 2200/12* (2013.01); *B60Y 2300/02* (2013.01)

(58) Field of Classification Search
CPC ...... B60W 30/02; B60W 10/06; B60W 10/18; B60W 2710/0666; B60W 2710/182; B60K 31/00; B60K 31/18; B60T 8/1706; B60T 8/173; B60T 8/175; B60T 8/17555; B60Y 2200/12; B60Y 2200/02
USPC .......................................................... 701/93
See application file for complete search history.

(56) References Cited

U.S. PATENT DOCUMENTS

| | | | |
|---|---|---|---|
| 7,917,274 B2* | 3/2011 | Hackney | B60T 8/1708 701/82 |
| 7,945,362 B2 | 5/2011 | Dobkin et al. | |
| 8,494,747 B2 | 7/2013 | Kremer et al. | |
| 9,682,709 B2* | 6/2017 | Baust | B60W 40/114 |
| 2010/0299028 A1 | 11/2010 | Savaresi et al. | |
| 2012/0041660 A1 | 2/2012 | Killian et al. | |

(Continued)

FOREIGN PATENT DOCUMENTS

| | | |
|---|---|---|
| DE | 102005021415 A1 | 11/2006 |
| DE | 102005047142 A1 | 4/2007 |

(Continued)

*Primary Examiner* — Krishnan Ramesh
(74) *Attorney, Agent, or Firm* — Michael Best & Friedrich LLP

(57) ABSTRACT

Systems and methods for detecting an oscillation of a vehicle. The system comprises a sensor configured to detect an oscillation of the vehicle, and an electronic controller configured to receive an oscillation signal from the sensor, compare the oscillation signal to a detection threshold, and in response to the comparison of the oscillation signal to the detection threshold, generate a signal to activate a braking system of the vehicle and generate a request to reduce torque in an engine of the vehicle.

16 Claims, 3 Drawing Sheets

(56) References Cited

U.S. PATENT DOCUMENTS

| | | |
|---|---|---|
| 2013/0066522 A1 | 3/2013 | Haas et al. |
| 2015/0307152 A1 | 10/2015 | Van Steenwyk |
| 2016/0059851 A1* | 3/2016 | Klier .................... B60W 30/02 701/70 |
| 2016/0082961 A1* | 3/2016 | Tashiro .................... B60T 8/00 701/93 |
| 2016/0229394 A1* | 8/2016 | Fujii .................... B60W 40/114 |
| 2017/0008500 A1 | 1/2017 | Iwatsuki |

FOREIGN PATENT DOCUMENTS

| | | |
|---|---|---|
| DE | 102005047145 A1 | 4/2007 |
| DE | 102008007139 A1 | 8/2008 |
| DE | 102010028689 A1 | 11/2011 |
| GB | 2445649 A | 7/2008 |
| WO | 2011054404 A1 | 5/2011 |

* cited by examiner

SYSTEMS AND METHODS FOR STABILIZING A VEHICLE

FIELD

Embodiments relate to a system for stabilizing a vehicle.

SUMMARY

Motorcycles, and other forms of vehicles, are susceptible to speed-induced oscillation, often called high-speed shimmy or wobble. If the oscillation becomes too quick or is allowed to continue for a prolonged period of time, an operator of the vehicle risks losing control of the vehicle and causing an accident, which may harm the operator of the vehicle or others.

The oscillation may be affected or amplified by potential design shortcomings of the vehicle, such as having frame compliance, having fork asymmetry, and others.

As a consequence, a system to detect speed-induced oscillation and help the operator correct for the presence of the speed-induced oscillation is desirable.

Embodiments described herein provide, among other things, methods and systems for stabilizing a vehicle.

One embodiment provides a system for stabilizing a vehicle. The system comprises a sensor configured to detect an oscillation of the vehicle and an electronic processor configured to receive an oscillation signal from the sensor, compare the oscillation signal to a detection threshold, and in response to the comparison of the oscillation signal to the detection threshold, generate a signal to active a braking system of the vehicle and generate a request to reduce torque in an engine of the vehicle.

Another embodiment provides a method for stabilizing a vehicle. The method comprises, using an electronic processor, receiving an oscillation signal from a sensor, comparing the oscillation signal to a detection threshold, and in response to the comparison of the oscillation signal and the detection threshold, generating a signal to activate a braking system of the vehicle and generating a request to reduce a torque of an engine of the vehicle.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on a non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
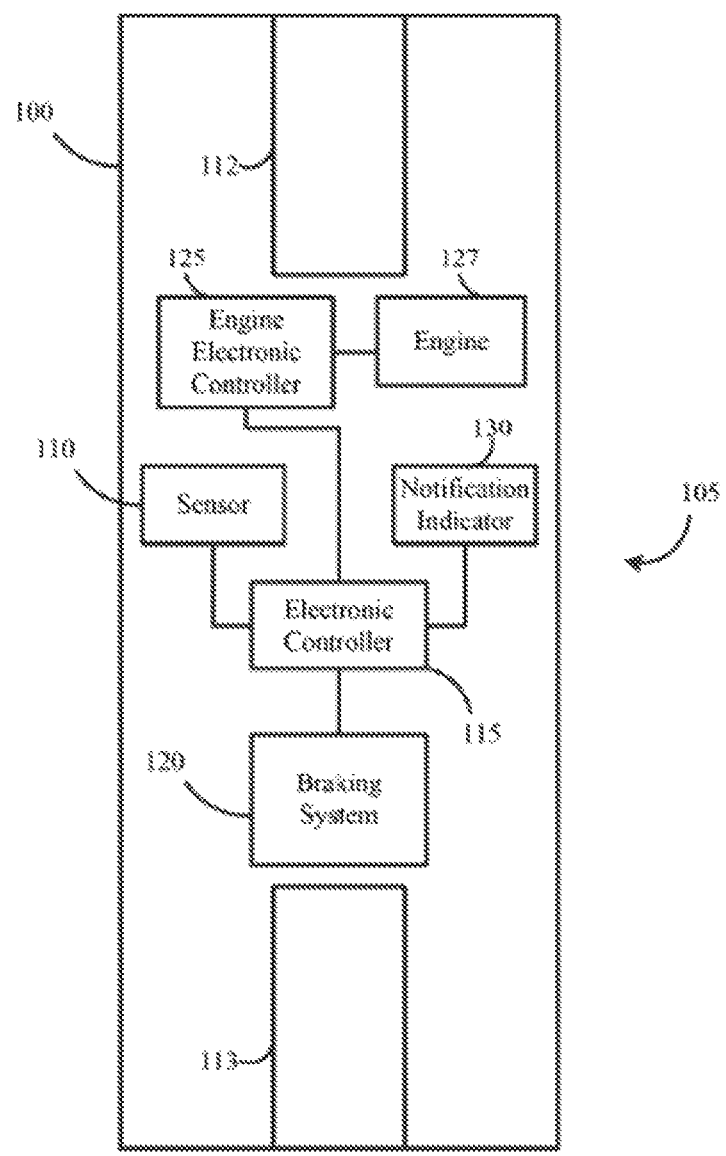
FIG. 1 is a block diagram of a vehicle with a stabilizing system according to one embodiment.

FIG. 1 illustrates an example of a vehicle 100 with a stabilizing system 105. The vehicle 100, although illustrated as a two-wheeled vehicle, may encompass various types and designs of vehicles. For example, the vehicle 100 may be a motorcycle, an automobile, a truck, a semi-tractor, and others. In the example illustrated, the stabilizing system 105 comprises a sensor 110, wheels 112 and 113, an electronic controller 115, a braking system 120, an engine electronic controller 125, an engine 127, and a notification indicator 130.

The sensor 110 is configured to detect an oscillation in the vehicle 100. The sensor 110 may be a gyroscopic sensor, an accelerometer, and the like. The sensor 110 may be coupled to a frame of the vehicle 100, an axle of the vehicle 100, and the like in order to detect oscillations in the vehicle 100.

The wheels 112 and 113 are connected to the vehicle 100. In some embodiments, the vehicle 100 includes more wheels than the two wheels 112 and 113. In further embodiments, the wheels 112 and 113 are connected to the braking system 120.

The electronic controller 115 may be communicatively coupled to the sensor 110, the braking system 120, the engine electronic controller 125, and the notification indicator 130 via various wired or wireless connections. For example, in some embodiments, the electronic controller is directly connected via a dedicated wire to each of the above-listed components of the stabilizing system 105. In other embodiments, the electronic controller 115 is communicatively coupled to one or more of the components via a shared communication link such as a vehicle communication bus (for example, a controller-area network (CAN) bus) or a wireless vehicle network.

The braking system 120 is configured to provide braking to the vehicle 100. According to one embodiment, the braking system 120 comprises brake pads, brake calipers, a hydraulic system, a speed sensor, and may further comprise an electronic controller. The electronic controller of the braking system 120 may be configured to receive a signal from the electronic controller 115 and apply one or more brake components to the wheels 112 and 113 on the vehicle 100 in order to slow down the vehicle.

The engine electronic controller 125, in one embodiment, is configured to receive a request from the electronic controller 115 and control the engine 127 of the vehicle 100. For example, the engine electronic controller 125 may be configured to reduce a torque in the engine 127 of the vehicle 100 in response to a request from the electronic controller 115. In other embodiments, the engine electronic controller 125 may be configured to control other operations of the engine 127.

The engine 127 is used to generate force to propel the vehicle 100. In some embodiments, the engine 127 is an internal combustion engine. In other embodiments, the engine 127 is a hybrid internal combustion and electric engine.

In some embodiments, the stabilizing system 105 does not include the engine electronic controller 125 and the functions of the engine electronic controller 125 are managed by the electronic controller 115. In these embodiments, the electronic controller 115 is connected to the engine 127.

The notification indicator 130 may be a light-emitting diode (LED) on a dashboard of the vehicle 100, a speaker configured to play a sound in the vehicle 100, and the like. The notification indicator 130 may be configured to receive a notification from the electronic controller 115.

Each of the above-listed components of the stabilizing system 105 may include dedicated processing circuitry including an electronic processor, an input-output interface, and a memory for receiving, processing, and transmitting data associated with the functions of each component. For example, the sensor 110 may include an electronic processor that determines parameters or values. In this case, the sensor 110 transmits the parameters or calculated values associated with the parameters to the electronic controller 115. Each of the components of the stabilizing system 105 may communicate with the electronic controller 115 using various communication protocols. The embodiment illustrated in FIG. 1 provides but one example of the components and couplings of the stabilizing system 105. These components and couplings may be constructed in other ways than those illustrated and described herein.

Figure 2:
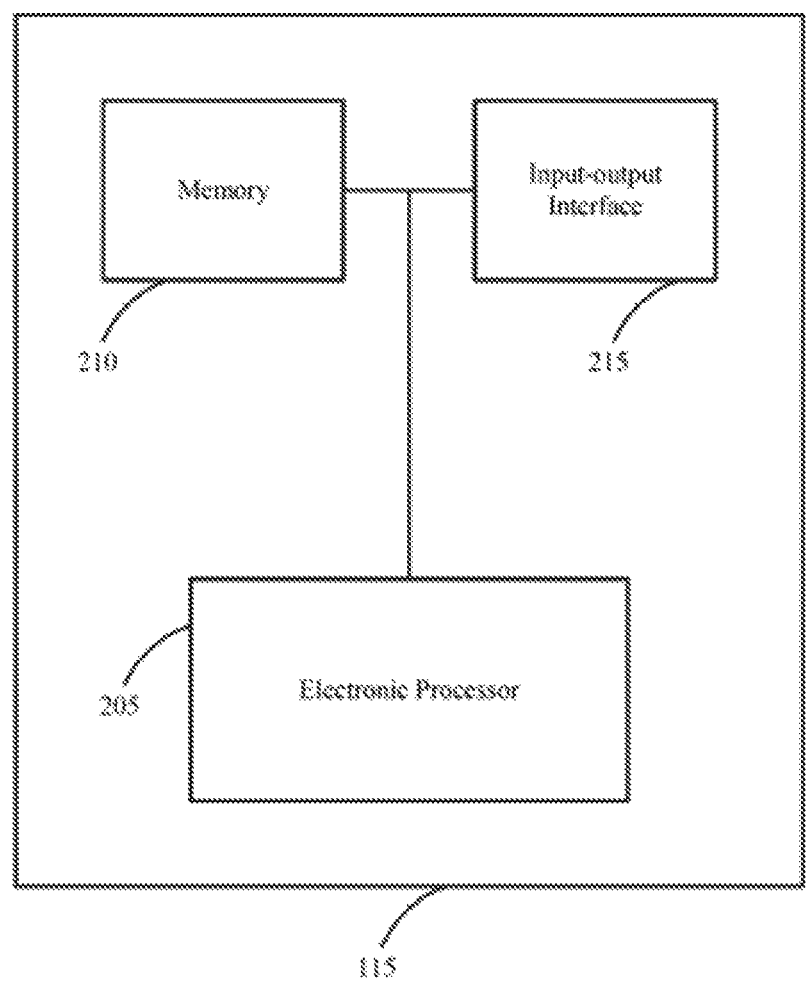
FIG. 2 is a block diagram for an electronic controller of a stabilizing system according to embodiment.

FIG. 2 is a block diagram of the electronic controller 115 of the stabilizing system 105 according to one embodiment. The electronic controller 15 includes a plurality of electrical and electronic components that provide power, operation control, and protection to the components and modules within the electronic controller 115. In the example illustrated, the electronic controller 115 includes, among other things, an electronic processor 205 (such as a programmable electronic microprocessor, microcontroller, application-specific integrated circuit, or similar device), a memory 210 (for example, non-transitory, machine readable memory), and an input-output interface 215. The electronic processor 205, in coordination with the memory 210 and the input-output interface 215, is configured to implement, among other things, the methods described herein.

The electronic controller 115 may be implemented in several independent controllers (for example, programmable electronic control units) each configured to perform specific functions or sub-functions. Additionally, the electronic controller 115 may contain sub-modules that include additional electronic processors, memory, or application-specific integrated circuits for handling input-output functions, processing of signals, and application of the methods listed below. In other embodiments, the electronic controller 115 includes additional, fewer, or different components.

The engine electronic controller 125, in some embodiments, has similar components as those components described above that comprise the electronic controller 115. In other embodiments, the engine electronic controller 125 contain additional, fewer, or different components than the electronic controller 115.

Figure 3:
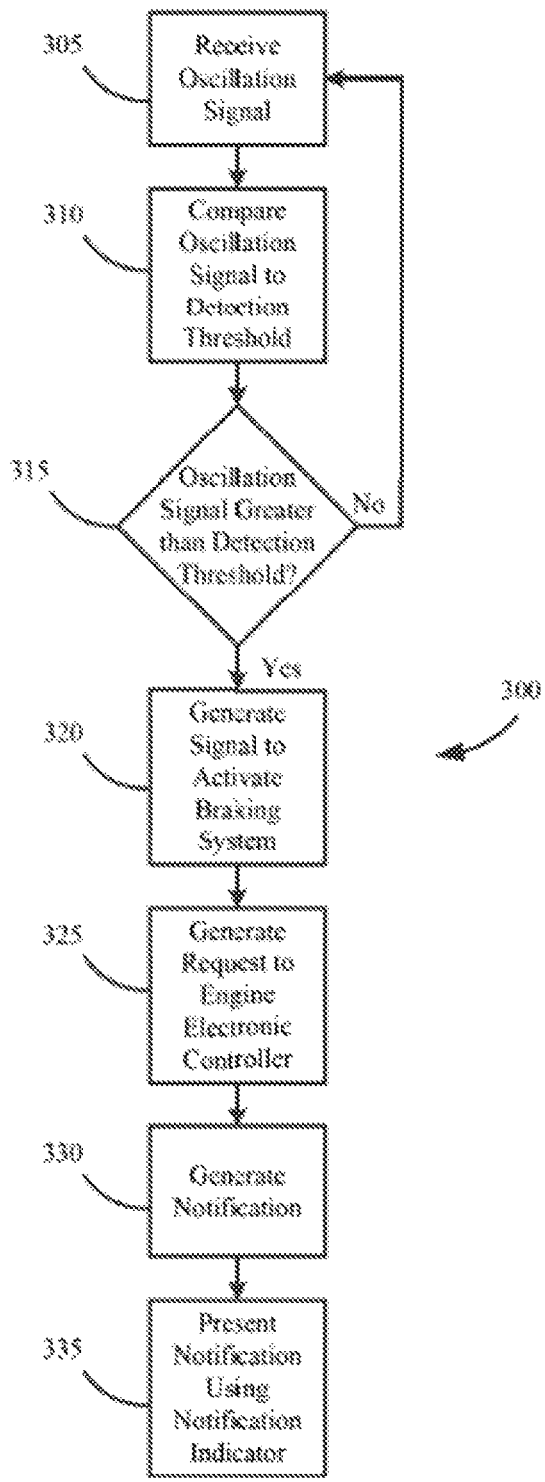
FIG. 3 is illustrates a method for stabilizing a vehicle according to one embodiment.

FIG. 3 illustrates a method 300 for stabilizing the vehicle 100 according to one embodiment. At step 305, the electronic controller 115 receives an oscillation signal from the sensor 110. In one embodiment, the oscillation signal is received as a wave signal including an amplitude and frequency (e.g., an oscillating wave signal with an amplitude of 0.4 meters and a 5 Hertz (Hz) frequency). The oscillation signal is representative of, in one embodiment, the side-to-side movement of the vehicle 100. The sensor 110 may detect the oscillation signal by being coupled to a suspension system of the vehicle 100, by being coupled to a frame of the vehicle 100, and the like.

The electronic processor 115 receives the oscillation signal (at step 305) and compares the oscillation signal to a detection threshold at step 310. In some embodiments, the detection threshold is defined at a set value for the electronic controller 115 to compare the oscillation signal to. In other embodiments, the electronic controller 115 may be further configured to determine the detection threshold based upon the type of the vehicle 100, a speed of the vehicle 100, and the like. For example, in one embodiment, if the vehicle 100 is going at a slow speed, a larger oscillation may be required to cause an accident or loss of control, while in other embodiments, the vehicle 100 is going at a faster speed, and a lower oscillation is required to cause an accident or loss of control.

At block 315, the electronic controller 115 determines if the oscillation signal is greater than the detection threshold. If the oscillation signal is less than the detection threshold, the electronic processor 115 returns to step 305 and waits to receive a new oscillation signal from the sensor 110. If the electronic processor 115 determines that the oscillation signal is greater than the detection threshold, an undesired amount of oscillation is detected in the vehicle 100 by the sensor 110. In some embodiments, the detection threshold is related to an amplitude of an oscillation signal (e.g., an oscillation of the vehicle of 0.4 meters). In other embodiments, the detection threshold is related to a frequency of an oscillation signal (e.g., an oscillation of the vehicle of more than 6 Hz).

If an undesired amount of oscillation is detected by the electronic controller 115, the electronic controller 115 is configured to generate a signal to activate the braking system 120 of the vehicle 100 at step 320. In one embodiment, the braking system 120 receives the signal to activate from the electronic controller 115 through an electronic processor of the braking system and applies one or more braking components (such as brake pads, brake calipers, and the like) in order to reduce a speed of the vehicle 100 to be at or below a speed threshold. In some embodiments, the braking system 120 is configured to apply the braking components directly. In other embodiments, the braking system 120 is configured to actuate the braking components by actively increasing the hydraulic pressure in the brake system 120.

The speed threshold may be a predetermined value (such as 20 miles per hour (MPH)) in one embodiment. In other embodiments, the electronic processor 115 may be further configured to determine the speed threshold based upon the oscillation signal and a current speed of the vehicle 100. For example, if the vehicle is traveling at 45 MPH, and the electronic processor 115 receives an oscillation signal including an amplitude of 0.6 meters (and the detection threshold is an amplitude of 0.4 meters), the electronic processor 115 may determine that, in order to reduce the oscillation of the vehicle 100, the vehicle 100 should be braked by the braking system 120 to a speed of 25 MPH. The electronic processor 115 may then send this value to the braking system 120 and, in one embodiment, the braking system 120 applies one or more braking components until a speed sensor of the braking system 120 indicates that the vehicle 100 is traveling at or below 25 MPH.

When an undesired amount of oscillation is detected by the electronic controller 115, the electronic controller 115 is configured to generate a request to reduce a torque of the engine 127 of the vehicle 100 at step 325. If the oscillation signal is determined to be above the detection threshold, the electronic controller 115 may generate a request to send to the engine electronic controller 125 requesting that the torque of the engine 127 of the vehicle 100 be reduced. Reducing the torque of the engine 127 of the vehicle 100 means less rotational force is applied to the engine 127, and less work is done to power the engine 127, thus reducing a speed at which the vehicle 100 can travel. The engine electronic controller 125 is configured to receive the request from the electronic controller 115 and generate a signal to reduce the torque in the engine 127 of the vehicle 100.

In some embodiments, in addition to generating a signal to activate the braking system 120 and a request to reduce a torque of the engine 127 of the vehicle 100, the electronic controller 115 is further configured to generate a notification for an operator of the vehicle 100, at step 330. The notification is then sent, at step 335, to the notification indicator 130. The notification is sent in a format that the notification indicator 130 can use. For example, the notification indicator 130 may be an LED on a dashboard of the vehicle 100. The electronic controller 115 may generate a signal to turn the LED to an "on" position (illuminating the LED), which indicates to the operator of the vehicle 100 that an oscillation that is undesirable has been detected by the sensor 110 (and determined by the electronic processor 115) and, therefore, the braking system 120 is being activated in response to the signal from the electronic processor 115 and the request to reduce the torque of the engine 127 of the vehicle 100 is being generated by the electronic processor 115 and carried out by the engine electronic processor 125. In another embodiment, an audio notification is generated and played over a speaker located in or on the vehicle 100 to notify the operator that the vehicle 100 is experiencing an undesired amount of oscillation.

It is advantageous that the operator of the vehicle 100 is notified when the undesired amount of oscillation is detected, so that the operator of the vehicle 100 is prepared for a speed of the vehicle 100 to be reduced by activating the braking system 120 and reducing the torque of the engine 127 of the vehicle 100. If the operator was not notified, the operator may be caught unaware and negatively react to the braking system 120 being activated and the torque of the engine 127 of the vehicle 100 being reduced. For example, the operator may suddenly pull on a steering mechanism of the vehicle 100 and lose control of the vehicle 100. In some embodiments, presenting the notification at step 335 may occur before the electronic processor 115 generates the signal to activate the braking system 120 at step 320, before the electronic processor 115 generates the request to reduce the torque of the engine 127 of the vehicle 100 at step 325, or both.

In some embodiments, there is more than one detection threshold. For example, a first detection threshold may be set at 0.2 meters and a second detection threshold may be set at 0.4 meters. If the electronic controller 115 receives an oscillation signal including an amplitude of 0.3 meters from the sensor 110, the electronic processor 115 determines that the first detection threshold has been exceeded, but that the second detection threshold has not been exceeded. In some embodiments, the electronic processor 115 may only generate a notification to present to an operator of the vehicle 100 that an oscillation has been detected by the sensor 110, and not generate a signal to activate the braking system 120 or generate a request to reduce a torque of the engine 127 of the vehicle 100.

As a consequence, the stabilizing system 105 stabilizes the vehicle 100 by receiving, using the electronic processor 115, the oscillation signal from the sensor 110, comparing the oscillation signal to the detection threshold, and in response to the comparison of the oscillation signal and the detection threshold, generating the signal to activate the braking system 120 of the vehicle 100 and generating the request to reduce the torque of the engine 127 of the vehicle 100.

Various features, advantages, and embodiments are set forth in the following claims.

What is claimed is:

1. A system for stabilizing a vehicle, the system comprising:
    a sensor configured to detect an oscillation of the vehicle, and
    an electronic controller configured to
        receive an oscillation signal from the sensor,
        compare the oscillation signal to a detection threshold, and
        in response to the comparison of the oscillation signal to the detection threshold, generate a signal to activate a braking system of the vehicle and generate a request to reduce torque in an engine of the vehicle, wherein the vehicle is slowed by at least one selected from the group consisting of activation of the braking system and reduction of torque in the engine until a speed of the vehicle is reduced below a speed threshold, the speed threshold determined based upon a current speed of the vehicle and the oscillation signal.

2. The system of claim 1, wherein the electronic controller is further configured to determine the detection threshold based upon the oscillation signal and the current speed of the vehicle.

3. The system of claim 2, wherein the electronic controller is further configured to determine a second detection threshold.

4. The system of claim 1, the system further comprising an engine electronic controller.

5. The system of claim 4, wherein the engine electronic controller is configured to receive the request from the electronic controller to reduce torque in the engine of the vehicle, and to control the engine to reduce torque.

6. The system of claim 1, the system further comprising a notification indicator.

7. The system of claim 6, wherein the electronic controller is further configured to generate a notification in response to the comparison of the oscillation signal to the detection threshold.

8. The system of claim 7, wherein the electronic controller is further configured to notify an operator of the vehicle by providing the notification to the notification indicator.

9. A method for stabilizing a vehicle, the method comprising:
    receiving, with an electronic controller, an oscillation signal from a sensor;
    comparing, with the electronic controller, the oscillation signal to a detection threshold; and,
    in response to the comparison of the oscillation signal to the detection threshold, generating a signal, with the electronic controller, to activate a braking system of the vehicle and generating, with the electronic controller, a request to reduce a torque of an engine in the vehicle, wherein the vehicle is slowed by at least one selected from the group consisting of activation of the braking system and reduction of torque in the engine until a speed of the vehicle is reduced below a speed threshold, the speed threshold determined based upon a current speed of the vehicle and the oscillation signal.

10. The method of claim 9, the method further comprising determining, with the electronic controller, the detection threshold based upon the oscillation signal and the current speed of the vehicle.

11. The method of claim 10, further comprising determining, with the electronic controller, a second detection threshold.

12. The method of claim 9, the method further comprising receiving, with an engine electronic controller, the request to reduce the torque of the engine of the vehicle.

13. The method of claim 12, the method further comprising controlling, with the engine electronic controller, the engine of the vehicle to reduce the torque.

14. The method of claim 9, the method further comprising generating, with the electronic controller, a notification in response to the comparison of the oscillation signal and the detection threshold.

15. The method of claim 14, the method further comprising providing, with the electronic controller, the notification to a notification indicator.

16. The method of claim 15, the method further comprising notifying an operator of the vehicle using the notification indicator when the notification indicator receives the notification.

* * * * *